Figure 1:
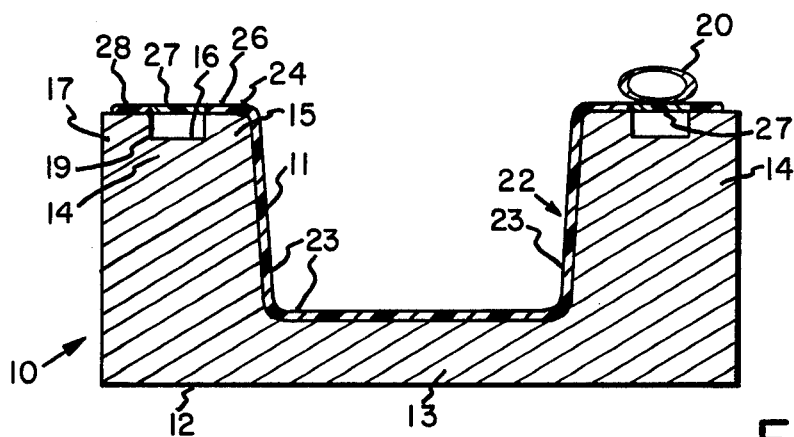

United States Patent [19]

Gartland

[11] Patent Number: 4,469,270
[45] Date of Patent: Sep. 4, 1984

[54] ARTICLE OF PARTIALLY CRYSTALLINE ORGANIC RESIN AND METHOD AND APPARATUS FOR MAKING SAME

[75] Inventor: Robert J. Gartland, Youngstown, Ohio

[73] Assignee: The Goodyear Tire & Rubber Company, Akron, Ohio

[21] Appl. No.: 409,769

[22] Filed: Aug. 20, 1982

Related U.S. Application Data

[62] Division of Ser. No. 244,836, Mar. 18, 1981, Pat. No. 4,374,800.

[51] Int. Cl.³ .................. B65D 1/00; B29C 17/04
[52] U.S. Cl. .................. 229/2.5 R; 264/522; 264/544; 264/550; 264/553; 206/557
[58] Field of Search .......... 229/2.5, 3.5 R, 21, 229/43, 48 T; 219/10.55; 264/544, 553, 522, 550; 426/106, 113; 428/35; 206/557

[56] References Cited

U.S. PATENT DOCUMENTS 3,865,302  2/1975  Kane ............................. 229/43
4,127,631  11/1978  Dempsey et al. ............... 264/92

Primary Examiner—Steven M. Pollard
Assistant Examiner—David Voorhees
Attorney, Agent, or Firm—Bruce J. Hendricks; Alvin T. Rockhill

[57] ABSTRACT

A shaped article such as a container of polyalkylene terephthalate resin is described. The shaped article includes a body portion in which the resin has an average crystallinity of at least about 20 percent. The shaped article is provided with the flange which adjoins the body portion of the article. At least part of the flange has an average crystallinity less than that of the body portion and preferably of not more than about 10 percent. Process and apparatus which may be employed in the manufacture of such an article are also described.

3 Claims, 3 Drawing Figures

HALF-TIME FOR CRYSTALLIZATION OF PET vs TEMP. (GOODYEAR VFR 3801)

ARTICLE OF PARTIALLY CRYSTALLINE ORGANIC RESIN AND METHOD AND APPARATUS FOR MAKING SAME

This is a division, of application Ser. No. 244,836 filed Mar. 18, 1981, now U.S. Pat. No. 4,374,800.

The abstract is not to be taken as limiting the invention of this application and in order to understand the full nature and extent of the technical disclosure of this application, reference must be made to the accompanying drawing and the following detailed description.

This invention relates to shaped articles formed by low pressure thermo-forming of polyalkylene terephthalate or other crystallizable organic resins and particularly to shaped articles, for example, containers for foods which exhibit improved sealing to known heat-sealable films. Such containers are typically employed for prepackaged food items which may be purchased by the consumer, stored in a food freezer, and reheated in either a conventional hot air oven or a microwave oven shortly before consumption.

Such containers must exhibit good dimensional stability, impact strength and the ability to accept a heat-sealable lidding film after filling by the food packaging firm. The resins to be employed in the manufacture of the article must, of course, be capable of being thermo-formed. It is known that when polyalkylene terephthalate resin and particularly a sheet of polyethylene terephthalate is heated to temperatures above 250° F. (120° C.) that crystallization of the formerly generally amorphous resin sheet occurs at a rapid rate. This thermally induced crystallization results in a stable thermo-formed article when the percent of crystallinity is sufficient. A particularly instructive example of art disclosing thermo-forming of polyalkylene terephthalate resin sheet is given in U.S. Pat. No. 4,127,631, the disclosure of which is incorporated herein by reference.

It has been learned that, in general, if a polyalkylene terephthalate (PAT) sheet has too much thermally induced average crystallinity, that is, in excess of about 10 percent, the adhesion of known lidding films to the resin sheet is reduced. This is quite undesirable, especially when the container is used in the distribution of food items. A typical commercial lidding film is available from Minnesota Mining and Manufacturing Company and known as type 5850 lidding film. This is a heat-sealable adhesive-treated, biaxially-oriented polyethylene terephthalate film.

As used herein, the average crystallinity of the PAT sheet is determined by relating the density of a sample of the sheet as determined by ASTM D-1505-68 method (Potassium Iodine Solution, Density Range 1.30 to 1.45).

Figure 2:
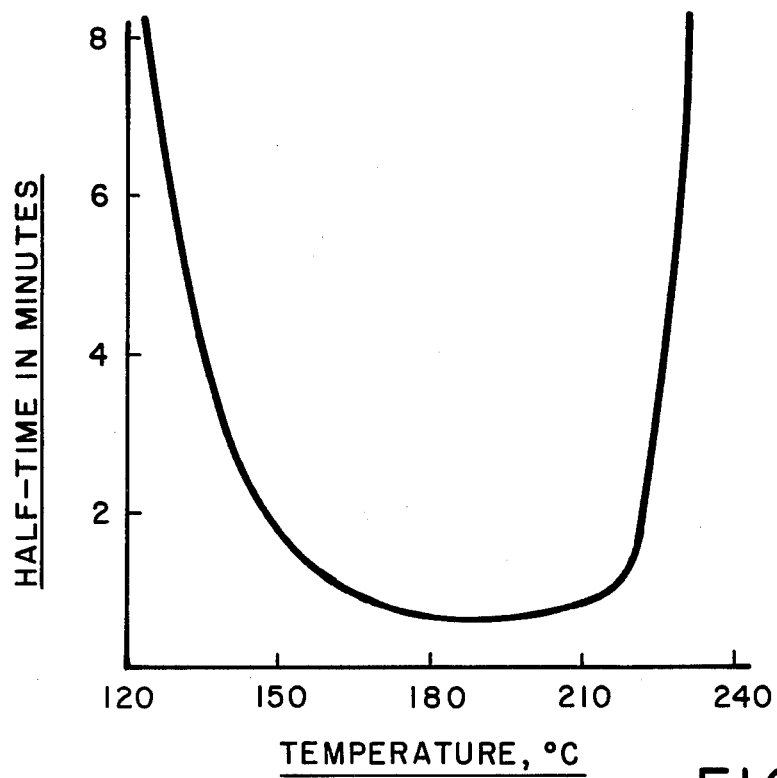
Figure 3:
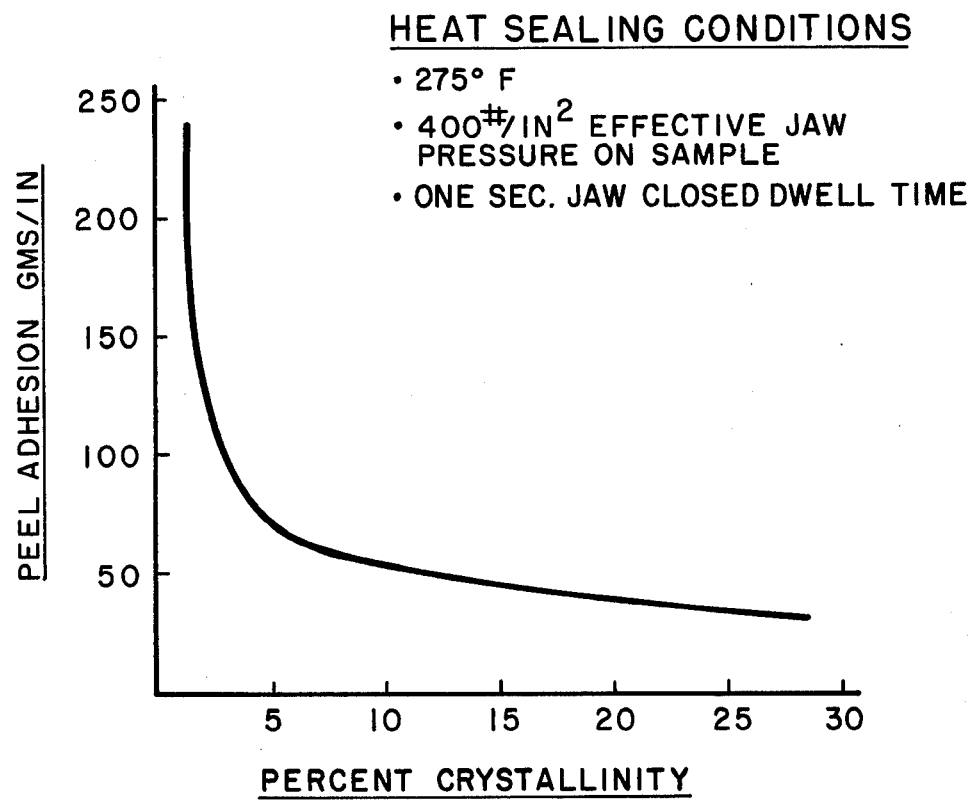

The invention may be better understood by reference to the accompanying drawings in which:

FIG. 1 is a sectional view of thermo-forming apparatus according to the invention illustrating a thermo-formed sheet of PAT resin in contact therewith;

FIG. 2 is a graph relating the half-time for crystallization of a polyethylene terephthalate (PET) resin versus temperature. The specific composition used to generate the data is Goodyear resin VFR 3801-0.6 IV (intrinsic viscosity) having no further additives; and FIG. 3 is a graph relating adhesion of the resin sheet to the lidding film to percent crystallinity of the resin sheet. The specific composition used to generate the data for this graph is Goodyear resin Vituf TM 1001A as substrate film, and Minnesota Mining and Manufacturing Company (3M TM) type 5850 lidding film, a heat-sealable adhesive-treated polyethylene terephthalate film.

Referring now to FIG. 1, there is shown apparatus 10 for use in thermo-forming a thermally crystallizable resin sheet 11. The apparatus 10 includes a mold 12 which is typically formed of a metal, for example, aluminum, which has been sandblasted to facilitate release of the completed thermo-formed articles. The mold 12 includes a body-forming portion 13 and a flange-forming portion 14 about the perimeter of the body-forming portion 13. The flange-forming portion 14 may be divided into three zones. The inner zone 15 of the flange-forming portion 14 is adjacent the body-forming portion 13 of the mold 12. The middle zone 16 of the flange-forming portion 14 is adjacent the inner zone 15. The outer zone 17 of the flange-forming portion 14 is adjacent the middle zone 16 of the flange-forming portion 14. In a preferred embodiment of the mold 12 designed for production of a tray including a recessed area and a flange about its perimeter, the inner, middle, and outer zones 15, 16, and 17, respectively, each extend in the perimetric direction of the flange. It is to be noted that the middle zone 16 of the flange-forming portion 14 of the mold is recessed and thus lies in a different plane from that of the inner and outer zones 15 and 17, respectively, of the flange-forming portion 14. This feature prevents unwanted heat transfer from the heated mold 12 to that part of the resin sheet 11 which overlies middle zone 16. In a preferred embodiment, the middle zone 16 of the flange-forming portion 14 is recessed about ⅛ to ½ inch (3 to 12 mm.) relative to the inner and outer zones 15 and 17, respectively.

Referring now to the right-hand portion of FIG. 1, there is illustrated in ghost lines cooling coil 20 as an example of the use or provision of external cooling means to maintain at least a part of the resin sheet 11 when in contact with the flange-forming portion 14 of the mold 12 at a temperature insufficient to induce an undesirable amount of thermal crystallization of the resin sheet. A cooling liquid or refrigerant could, of course, be directed through cooling coil 20. By use of external cooling means such as cooling coil 20 precise and positive control of the temperature of a part of the shaped article can be obtained which is different from that of the remainder of the thermo-forming mold. Alternatively, a stream of cooling gas could be directed at the flange-forming portion 14 to rapidly reduce in temperature and maintain at a reduced temperature the resin sheet in this area.

In FIG. 1, there is also shown in section a container 22 which is thermo-formed of a polyethylene terephthalate resin sheet 11. Container 22 includes a body portion 23 in which the resin has an average crystallinity of at least about 20 percent. Flange 24 of container 22 adjoins the body portion 23. The flange may be considered as being divisible into three distinct zones: an inner zone 26 of container flange 24 nearest to the body portion 23 of container 22, an outer zone 28 of the container flange 24 farthest from the body portion 23 of the container and a middle zone 27 of the container flange 24 which lies between respective inner and outer zones 26 and 28 of the container flange 24. In a preferred embodiment of the container 22 each of the respective inner, middle and outer zones of the flange 24 extend around the perimeter of the body portion 23 of the container. In a preferred embodiment of the container, the middle zone 27 of the flange 24 has an average crystallinity of not more than about 10 percent. The average crystallinity of the middle zone 27 of the container flange 24 is lower than that of the body portion 23. The average crystallinity of the inner and outer zones 26 and 28 respectively of the container flange 24 are preferably about the same as that of the body portion 23 of the container 22. It is desirable to provide an outer flange zone 28 of 20 percent or greater crystallinity to facilitate trimming of the container after molding. Amorphous PAT film tends to orient during shearing, thus requiring higher speeds, clamping force, and sharper cutting edges than are required to trim by shearing crystallized PAT film.

Container 22 may be thermo-formed of resin sheet 11 utilizing mold 12 as follows:

a sheet of polyethylene terephthalate resin of about 20 mils thickness and which is substantially unoriented and has an initial crystallinity in the range of zero to 10 percent is quickly preheated in a manner so as to not increase the average thermally induced crystallinity to more than 10 percent. This may be accomplished by, e.g. radient lamps, such as Calrod ™ heaters or quartz lamps, microwave or convection. As a specific example, a 20 mil sheet of Goodyear resin Vituf ™ 1001A was preheated utilizing Calrod ™ heaters to a temperature of 135° C. within 26 seconds.

The preheated sheet is then quickly contacted and conformed with a mold 12 which is at a temperature in the range of about 140° to 190° C. A differential in pressure is applied to the resin sheet 11 to conform the sheet 11 to the mold 12. Those skilled in the art readily appreciate that vacuum may be used or a combination of vacuum and pressurized gas on the opposite sides of the sheet. Those skilled in the art also appreciate that a plug may be used to facilitate molding of the resin sheet 11. Thereafter, the conformed sheet 11 is maintained in contact with the heated mold 12 until the average crystallinity of the sheet 11 is increased to at least about 20 percent in those portions of the sheet which form the body portion 23 of container 22 and the inner zone 26 and outer zone 28 of the flange 24 of the container 22. That portion of the resin sheet 11 which corresponds to the middle zone 27 of container flange 24 is rapidly reduced in temperature and maintained at a reduced temperature such that the average crystallinity does not increase like that of the body portion 23 of the container and preferably not beyond 10 percent. Referring to the left side of FIG. 1, the presence of air gap 19 between the resin sheet 11 and the middle zone 16 of the flange-forming portion 14 of mold 12 restricts heat transfer from the heated mold to this area of the resin sheet 11. This limited area of the resin sheet 11 quickly cools down below that temperature at which appreciable thermally induced crystallization occurs. Of course, external cooling means, such as cooling coil 20 shown in the right-hand portion of FIG. 1 may be employed to assure that the middle zone 27 of the container flange 24 is maintained below that temperature at which appreciable thermally induced crystallinity occurs.

After thermo-forming resin sheet 11 and allowing controlled thermally induced crystallization to occur, the thermo-formed sheet is removed from the mold 12.

When polyethylene terephthalate resin sheet is employed, it is preferred that the body-forming portion 13 of the mold 12 be at a temperature in the range of about 140° to 190° C. At least a part of the flange-forming portion 14 of the mold should be at a temperature of less than about 120° C. and preferably less than 110° C., which is less than that of the body-forming portion 13 of the mold. Preferably, that part of the resin sheet 11 overlying the middle zone 16 of the flange-forming portion 14 is quickly reduced in temperature to avoid appreciable thermally induced crystallization.

EXAMPLE I

A 20 mil PET sheet was extruded from Goodyear PET Vituf ™ 1001A (IV 1.04) containing 10 weight parts of $TiO_2$ per thousand weight parts of resin. A Comet Lab Master thermoformer Model 14-20, made by Comet Industries, Ill., was used for molding work. The top heater was off and the bottom heater was on continuously in the oven (indicated temperature at the top 150° C.) The PET sheet was placed in a frame and shuttled into the oven for 26 seconds. (Film temperature out of the oven was 140° C.) The film was quickly transferred to the hot mold (170° C.), vacuum formed and held for 10 to 15 seconds. Vacuum to the mold was then broken and air pressure was used to assist in demolding while simultaneously withdrawing the mold from the part. The average crystallinity of the part was 28 percent and the overall appearance was excellent. The part was then trimmed. The outer crystalized ring in the flange provided an excellent area in which the trimming operation was easily accomplished by cutting or shearing.

In FIG. 2 there is presented a graph of half-time for crystallization or polyethylene terephthalate versus temperature of the resin. This graph is specific for Goodyear resin VFR 3801-IV 0.6 without further additives, and is given as an example only. The specific curve for a different polyalkylene terephthalate or other PET resin would, of course, be different from that shown but of the same general nature. Such curves are useful to those skilled in the art in selecting specific process parameters for the product they intend to manufacture and the material they intend to employ in the manufacture of that product.

FIG. 3 graphically shows the relationship between adhesion level of the heat-sealable lidding film (3M ™ type 5850) to a PET film (Goodyear Vituf ™ 1001A) with varying percent crystallinity when the heat-sealing conditions are held constant. Clearly, the increase in peel adhesion of the lidding film is dramatic at low levels of crystallinity of the substrate PET film. To generate this data, a Sentinel Heat Sealer (platen type) was employed having a jaw temperature of 275° F. (135° C.), an effective jaw pressure on the sample of about 400 pounds per square inch, and a jaw-closed dwell time of about one second. If higher jaw temperature and/or longer dwell time were used, the adhesion curve would shift to the right and reveal greater adhesion at higher percent crystallinity of the substrate film, but would be of the same general nature.

The example disclosed is intended to illustrate this invention without limiting it. Variations on this example are obvious to one skilled in the art and are intended to be within the scope of this invention.

While certain representative embodiments and details have been described for the purpose of illustrating the invention, it will be apparent to those skilled in this art that various changes and modifications may be made therein without departing from the spirit or scope of the invention.

What is claimed is:

1. A container prepared by a process for thermoforming a thermally crystallizable polyalkylene terephthalate resin sheet which is substantially unoriented and has an initial thermally induced crystallinity of less than 10% into a container having a perimetric flange surrounding a body portion comprising:
   (a) rapidly preheating the sheet so as not to increase the average thermally induced crystallinity to more than 10% and very shortly thereafter,
   (b) contacting and conforming the sheet while preheated with a heated mold having a body-forming portion which is at a temperature in the range of 140° to 190° C. and a flange-forming portion surrounding the body-forming portion,
   (c) simultaneously with step (b) rapidly reducing the temperature of a part of that portion of said sheet which overlies the flange-forming portion of said mold to reduce the rate of thermally induced crystallization thereof,
   (d) maintaining contact of the conformed sheet with the heated mold until an average crystallinity of at least about 20% is achieved in that portion of the sheet which contacts the body-forming portion of the mold while maintaining said part of that portion of the sheet which overlies the flange-forming portion of the mold at a lower temperature; and
   (e) removing the thermoformed sheet from the mold.

2. A container prepared by a process for thermoforming a thermally crystallizable polyalkylene terephthalate resin sheet which is substantially unoriented and has an initial thermally induced crystallinity in the range of 0 to 10% into a container including a perimetric flange surrounding a body portion, comprising:
   (a) preheating the sheet without increasing the average thermally induced crystallinity to more than 10%,
   (b) contacting the preheated sheet with a mold having a body-forming portion which is at a temperature in the range of 140° to 190° C., and a flange-forming portion which includes a first part which is at a temperature lower than that the body-forming portion and less than 120° C., and a second part which is at a temperature comparable to that of the body-forming portion,
   (c) applying a differential in pressure to the sheet to conform the sheet to the mold,
   (d) maintaining contact of the conformed sheet with the mold until an average crystallinity of at least 20% is achieved in that portion of the sheet which contacts the body-forming portion and said second part of the flange-forming portion of the mold while the average crystallinity of said part of that portion of the sheet which overlies said first part of the flange-forming portion of the mold does not increase beyond 10%; and
   (e) removing the thermoformed sheet from the mold.

3. A container prepared by a process for thermoforming a thermally crystallizable polyalkylene terephthalate resin sheet which is substantially unoriented and has an initial thermally induced crystallinity of less than 10% into a container having a perimetric flange surrounding a body portion, said flange including at least first and second zones with each zone extending in the perimetric direction of the flange, comprising:
   (a) rapidly preheating the sheet so as not to increase the average thermally induced crystallinity to more than 10% and very shortly thereafter,
   (b) contacting and confronting the preheated sheet with a mold having a body-forming portion and a flange-forming portion which includes a first part which is at a temperature lower than that of the body-forming portion and less than 110° C., and a second part which is at a temperature comparable to that of the body-forming portion,
   (c) simulanteously with step (b) rapidly reducing the temperature of that portion of the sheet which will form the first zone of the flange to reduce the rate of thermally induced crystallization thereof,
   (d) maintaining contact of the conformed sheet with the heated mold until an average crystallinity of at least 20% is achieved in those portions of the sheet which contact the body-forming portion of the mold and which form the second zone of the flange while maintaining that portion of the sheet which forms the first zone of the perimetric flange at a lower temperature to avoid appreciable thermally induced crystallinity therein; and
   (e) removing the thermoformed sheet from the mold.

* * * * *